United States Patent [19]

Fuke

[11] Patent Number: 4,638,677
[45] Date of Patent: Jan. 27, 1987

[54] INTERMITTENT DRIVE MEMBER
[75] Inventor: Takamichi Fuke, Furukawa, Japan
[73] Assignee: Alps Electric Co., Ltd., Japan
[21] Appl. No.: 650,401
[22] Filed: Sep. 12, 1984
[30] Foreign Application Priority Data Sep. 12, 1983 [JP] Japan .................. 58-140169[U]

[51] Int. Cl.⁴ .................. F16H 25/20; F16H 55/02
[52] U.S. Cl. .................. 74/84 R; 74/89.15;
74/424.8 R; 74/426; 74/458
[58] Field of Search .......... 74/84 R, 89.15, 424.8 R,
74/426, 458, 459; 360/106

[56] References Cited
U.S. PATENT DOCUMENTS

| | | | |
|---|---|---|---|
| 1,384,541 | 7/1921 | Schmick | 74/458 |
| 1,384,543 | 7/1921 | Schmick | 74/458 |
| 1,482,622 | 2/1924 | Schmick | 74/458 |
| 1,989,611 | 1/1935 | Dall et al. | 74/459 |
| 3,475,705 | 10/1969 | Lindemann | 74/89.15 |
| 3,640,138 | 2/1972 | Hahn et al. | 74/89.15 |
| 4,383,283 | 5/1983 | Machut | 360/97 |

Primary Examiner—Lawrence Staab
Attorney, Agent, or Firm—Guy W. Shoup

[57] ABSTRACT

An intermittent drive member comprises a shaft with a spiral groove formed in the outer periphery of the shaft. The spiral groove includes a plurality of groove portions each having a linear bottom portion with a lead angle of zero degrees and a plurality of chamfered portions. The groove portions are successively formed by being axially shifted one after one along the shaft, and each of the chamfered portions forms the connection between adjacent groove portions.

The intermittent drive member is employed in a mechanism which includes an electric motor for driving the shaft and a movable member having a tip end portion slidably fitted in the spiral groove so that the movable member is displaced when the shaft is rotated. The shaft is rotated to move the movable member in a predetermined direction when the tip end portion is in each of the chamfered portions, while the motor is deenergized to stop the movement of the shaft when the tip end portion is in each of the groove portions.

4 Claims, 12 Drawing Figures

INTERMITTENT DRIVE MEMBER

BACKGROUND OF THE INVENTION

1. Field of the Invention

The present invention relates to a drive member provided with a spiral groove for intermittently driving another member upon intermitten rotation of the drive member.

2. Description of Prior Art

Figure 1:
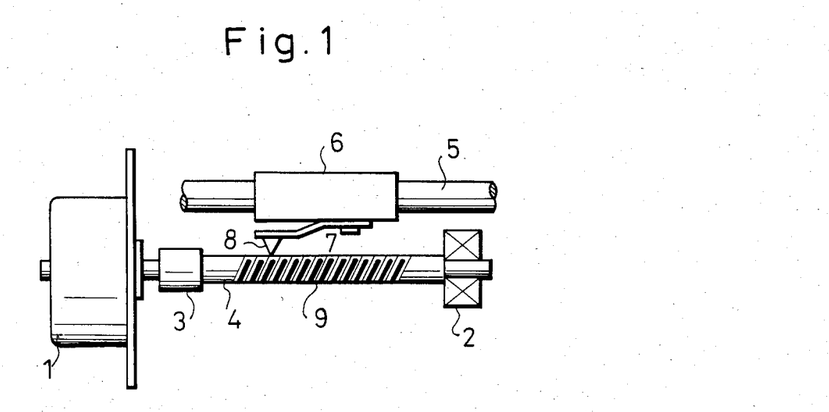
FIG. 1 is a schematic diagram of the intermittently feeding mechanism.

FIG. 1 is a schematic diagram showing the arrangement of a drive mechanism provided with an intermittent drive member 4 formed with a spiral groove 9. The drive member 4 is supported between a bearing 2 and a coupling 3 connecting it to a drive motor 1 which may be rotated intermittently in either direction.

A guide bar 5 is provided in parallel to the screw member 4, and a movable member 6 is slidably fitted onto the guide bar 5. A tip portion 8 connected at the lower end portion of the movable member 6 through a plate spring 7 is slidably fitted into the spiral groove 9 formed in the outer periphery of the drive or screw member 4. Thus, the movable member 6 is adapted to reciprocate within a predetermined range by being guided by the guide bar 5, in response to te forward-/backward rotation of the screw member 4.

Figure 2:
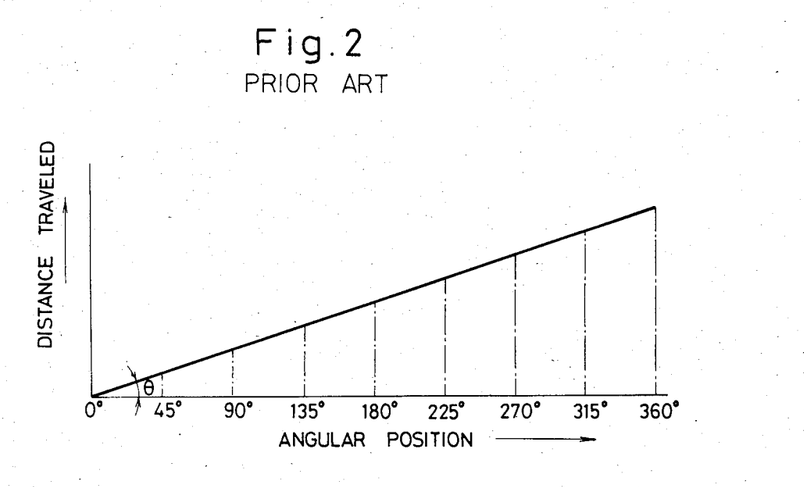
FIG. 2 is an explanatory diagram showing the leading angle of the conventional intermittently feeding parts.

When it is necessary to drive the movable member 6 intermittently in predetermined intervals, the motor 1 is intermittently energized to rotate the screw that a spiral groove 9 has a uniform or the same leading angle $\Theta$ over the entire circumference as shown in FIG. 2, so that the spiral groove 9 becomes linear when it is developed. Therefore, when it was required to intermittently stop the movable member 4, for example, at eight portions, that is at the revolution angles of 0°, 45°, 90°, 135°, 180°, 225°, 270°, and 315° of the screw member 4, there has been a problem in reliability because there were variations in revolution angles of the screw member 4 or because of shift in control of rotation of the same so that the position of the movable member 6 might come off to thereby make it impossible to stop the movable member 6 at proper positions. Further, there was another problem that an error in feeding quantity was apt to be generated due to offset in controlling the revolution of the motor 1 as described above, so that in order to reduce such offset, it was necessary to employ a highly accurate, that is very expensive, motor.

SUMMARY OF THE INVENTION

An object of the present invention is therefore to eliminate the drawbacks in the prior art.

Another object of the present invention is to provide an intermittently feeding member in which the accuracy in stop position of a movable member in an intermittently feeding mechanism can be improved, in which the requirement for accuracy of a motor used in the intermittently feeding mechanism can be reduced, and in which the movable member can be smoothly moved.

In order to achieve the object, according to one aspect of the present invention, the intermittently feeding member comprises a shaft; a spiral groove formed in the outer periphery of the shaft, the spiral groove including a plurality of groove portions each having a linear bottom portion with a leading angle of zero degree and including a plurality of chamfered portions, the groove portions being successively formed by being axially shifted one after one in a shaft, each of the chamfered portions being formed at each joint portion between adjacent ones of the groove portions.

According to another aspect of the present invention, the intermittently feeding member is employed in an intermittently feeding mechanism which comprises the above-mentioned intermittently feeding member; an electric motor for driving the shaft; a movable member having a tip end portion slidably fitted in the spiral groove so that the movable member is displaced when the shaft is rotated. The shaft is rotated to move the movable member in a predetermined direction when the tip end portion is in each of the chamfered portions, while the motor is deenergized to stop the movement of the shaft when the tip end portion is in each of the groove portions.

Other features and advantages of the invention will be apparent from the following description taken in connection with the accompanying drawings.

DESCRIPTION OF PREFERRED EMBODIMENTS

Referring to FIGS. 3 to 12, embodiments of the present invention will be described in detail.

Figure 3:
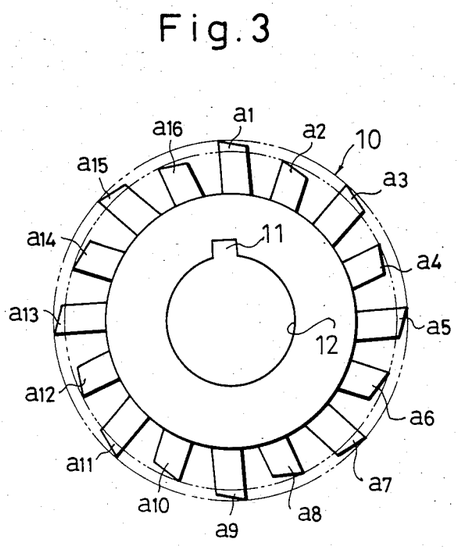
FIG. 3 is a side view of the cutting tool according to an embodiment of the present invention.
Figure 4:
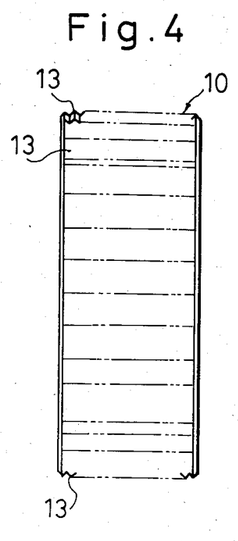
FIG. 4 is a front view of the cutting tool of FIG. 3.
Figure 5:
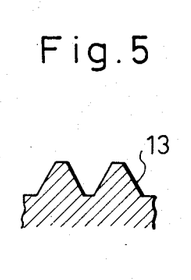
FIG. 5 is an enlarged cross-section of the cutting tool of FIG. 3
Figure 6:
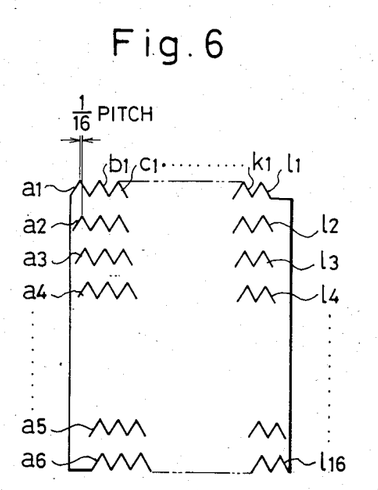
FIG. 6 is an explanatory diagram showing the developed state of the cutting tool of FIG. 3

FIG. 3 is a side view of a cutting tool for machining an object to be worked or workpiece to form a spiral groove therein and FIG. 4 is a front view of the cutting tool. In the drawings, a cutting tool 10 comprises a cylindrical body made of carbon steel and formed at its center with a fitting hole 12 together with a key way 11, and numbers of cemented carbide cutting edges 13 arranged at the outer periphery of the cylindrical body. As shown in FIG. 5, each cutting edge 13 has a cross-section of an angular shape the top of which is made somewhat linear.

The cutting edges 13 are formed in large numbers such that numbers of circumferential trains of such cutting edges are successively axially formed, each circumferential train including n cutting edges. Among the cutting edges 13, one having a large length and one having a small length are alternately successively arranged and adjacent cutting edges 13 are offset by $(2\pi)/n$ radians in the circumferential direction and by $1/n$ pitch in the axial direction. In this embodiment, as will be apparent in FIG. 6 which is a explanatory diagram showing the state in which the cutting toll 10 is developed in the axial direction, twelve circumferential trains a to 1 of cutting edges 13 are axially arranged and successively offset one from another by 1/16 pitch, each circumferential train being composed of sixteen cutting edges 13 including alternately long and short ones and circumferentially spaced from one another by 22.5 degrees ($(2\pi)/16$ radians ). Accordingly, the first long cutting edge $a_1$ of the first train and the second short cutting edge $a_2$ of the same train are offset from each other by 22.5 degrees in the circumferential direction and by 1/16 pitch in the axial direction. Similarly to this, the 16th short cutting edge $a_{16}$ in the first train and the first long cutting edge $b_1$ in the second train are offset from each other by 22.5 degrees in the circumferential direction and by 1/16 pitch in the axial direction. Thus, the respective cutting edges from the first long cutting edge $a_1$ of the first train to the 16th short cutting edge $1_{16}$ in the 12th train are successively offset one from another in the same manner as described above.

Figure 7:
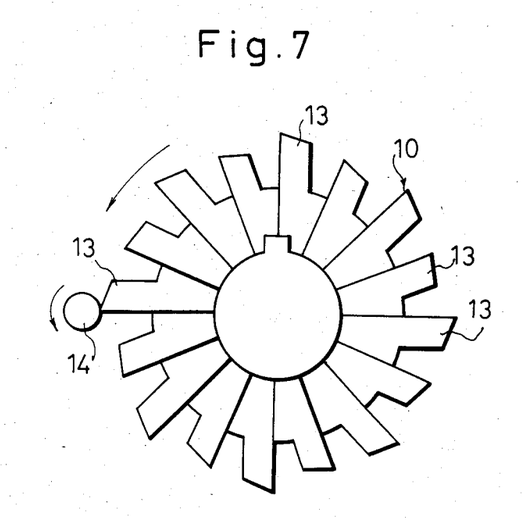
FIGS. 7 to 9 are side views showing cutting states of the workpiece by the cutting tool of FIG. 3.
Figure 8:
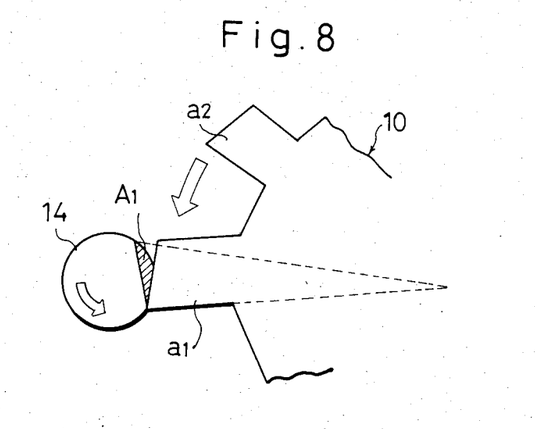
Figure 9:
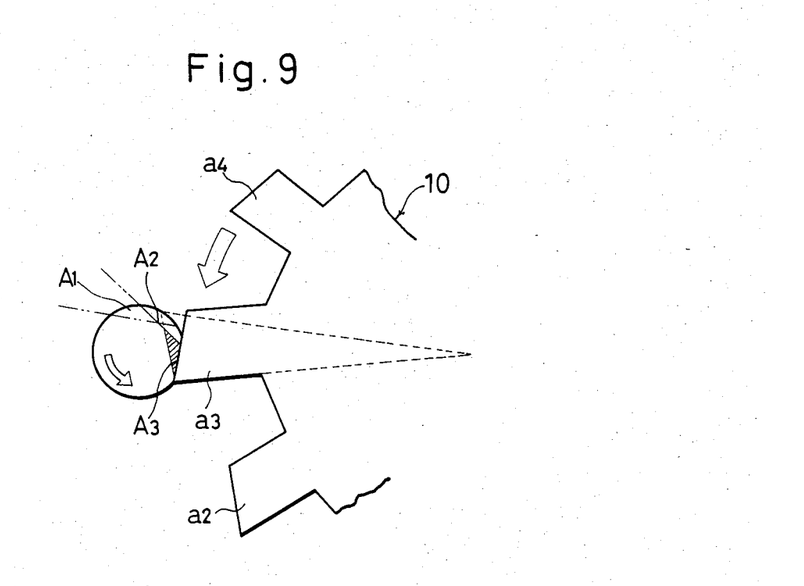

FIGS. 7 to 9 are side views showing the states of cutting by using the above-mentioned cutting tool 10. In the drawing, reference numeral 14 designates a workpiece which is a round bar having a diameter of 1/10 of that of the cutting tool 10. The workpiece 14 and the cutting tool 10 are rotated counterclockwise with a rotation ratio of 1:1.

If the cutting tool 10 and the workpiece 14 are rotated in the direction of arrow with a rotation ratio of 1:1 as shown in FIG. 8 and the cutting tool 10 is fed toward the center of the workpiece 14 by a predetermined quantity, a locus of contact point between the cutting tool 10 and the workpiece 14 becomes an approximate straight line and the hatched portion of the workpiece 14 is cut off by the long cutting edge $a_1$. Thus, a groove portion $A_1$ of the same V-shaped cross-section as the cutting edge 13 is formed in the outer periphery of the workpiece 14, the groove portion $A_1$ is parallel to the vertical line perpendicular to the axial line of the workpiece 14. Since the cutting tool 10 and the workpiece 14 are rotated in the same direction of arrow at different peripheral speeds, the next short cutting edge $a_2$ initiates to draw a new locus of contact point between the cutting tool 10 and the workpiece 14 so that a new V-shaped groove portion $A_2$ is formed in the workpiece at a position thereof axially offset by 1/16 pitch from the groove portion $A_1$ formed by the cutting edge $a_1$. When the cutting tool 10 and the workpiece 14 are further rotated, as shown in FIG. 9, the next long cutting edge $a_3$ initiates to draw a new locus of contact point between the cutting tool 10 and the workpiece 14 so as to form in the workpiece 14 a V-shaped groove portion $A_3$ of the same depth as the above-mentioned cutting edge $a_1$. Accordingly, the groove portion $A_3$ formed by the cutting edge $a_3$ is axially offset by 1/16 pitch from the groove portion $A_2$ formed by the cutting edge $a_2$, and axially offset by $\frac{1}{8}$ pitch from the groove portion $A_1$ formed by the cutting edge $a_1$. Since the depth of the groove portion $A_2$ formed by the cutting edge $a_2$ is shallower than the groove portions $A_1$ and $A_3$ formed by the cutting edges $a_1$ and $a_3$ respectively, the joining portion between the groove portions $A_1$ and $A_3$ formed by the cutting edges $a_1$ and $a_3$ respectively is formed in the state as if the joining portion is chamfered by the groove portion $A_2$ formed by the cutting edge $a_2$, as shown in the drawing. In the same manner, upon one rotation of the cutting tool 10, a groove portion formed by a long cutting edge and having relatively long linear bottom portion and a chamfered portion formed by a short cutting edge are successively alternately formed in the state that the groove portions are successively axially offset one after one by 1/16 pitch, so that 16 groove portions is formed to thereby form a screw portion of the same length as that across the trains of cutting edges (twelve trains a to 1 in this embodiment). In the case where a groove portion having a desired depth can not be cut by only a locus of contact point, it is sufficient to continuously rotate the cutting tool 10 with the reduced quantity of feed of the cutting tool 10 to decrease the cutting quantity by each cutting edge 13.

Figure 10:
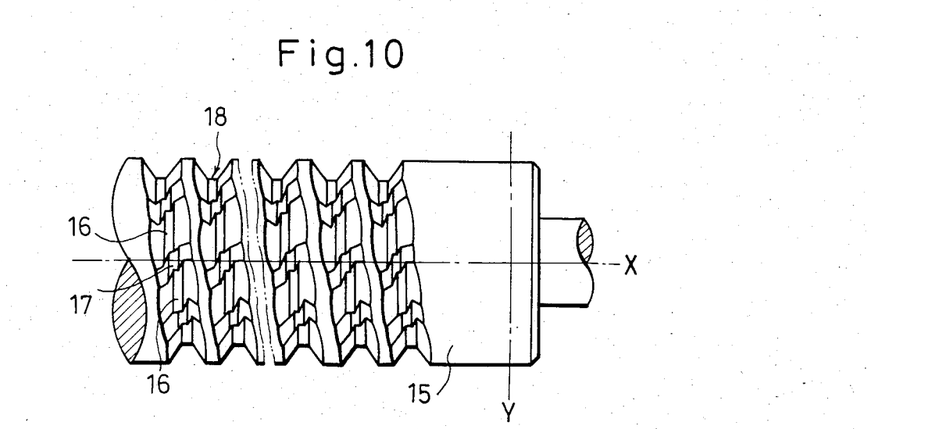
FIG. 10 is a front view of the intermittently feeding member according to the present invention
Figure 11:
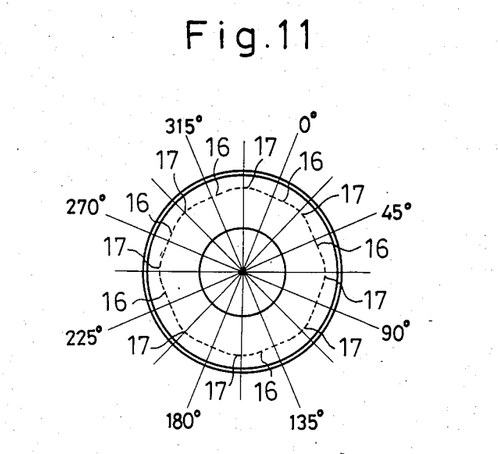
FIG. 11 is a right side view of the intermittently feeding member shown in FIG. 10.
Figure 12:
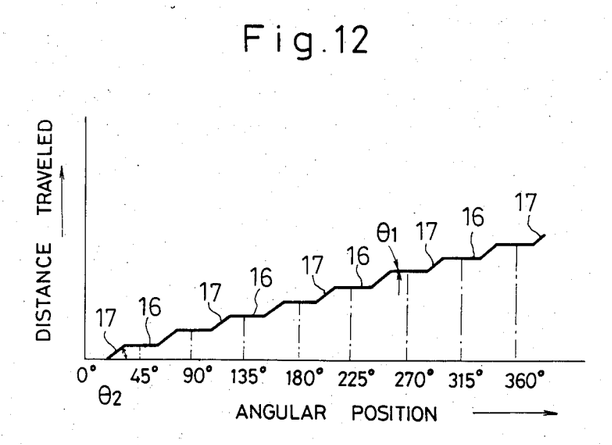
FIG. 12 is an explanatory diagram showing the leading angle of the intermittently feeding member shown in FIG. 10.

FIG. 10 is a front view of the intermittently feeding member according to the present invention produced by the method as described above, FIG. 11 is a right side view of the intermittently feeding member of FIG. 10, and FIG. 12 is an explanatory diagram showing the leading angle of the intermittently feeding member of FIG. 10. In the drawings, reference numeral 15 designates a shaft, 16 a groove portion, 17 a chamfered portion, and 18 a spiral groove.

In the outer periphery of the shaft 15, numbers of the groove portions 16 each having a linear bottom portion and the chamfered portions 17 are formed alternately one by one over a predetermined range. Each of the groove portions 16 is parallel with a vertical line Y perpendicular to the axis X of the shaft 15, that is has a leading angle of $\Theta_1$. Eight groove portions 16 are circumferentially equidistantly formed with axial offset one from another by $\frac{1}{8}$ pitch. Although eight chamfered portions 17 are circumferentially equidistantly formed with axial offset one from another by $\frac{1}{8}$ pitch, the depth of each of the chamfered portions 17 is shallower than the groove portions 16 and therefore each chamfered portion serves as if the joining portion between the chamfered portion 17 and the groove portion 16 adjacent to the chamfered portion 17 is chamfered by the chamfered portion. Thus, the groove portions 16 and the chamfered portions 17 form a single spiral groove 18 and each of the chamfered portions 17 serves as a feeding portion of a movable member which will be described later. In the thus formed spiral groove 18 of intermittently feeding member, the tip portion 8 of the movable member 6 described as to FIG. 1 is slidably fitted. In an intermittenly feeding mechanism provided with such an intermittently feeding member, when the tip portion 8 slides on the chamfered portion 17 as the shaft 15 rotates, the movable member 6 is displaced in a predetermined direction corresponding to the leading angle $\Theta_2$ of the chamfered portion 17, and when the tip portion 8 comes to the groove portion 16 the motor 1 is deenergized so that the movement of the movable member 6 is stopped. Thus, the movable member 6 is fed by the chamfered portion 17 and stopped by the groove portion 16 to thereby perform the intermittent feeding of the movable member 6. Since the leading angle $\Theta_1$ is zero at the groove portion 16 as described above, the stop position of the movable member 6 is proper even if the rotation angel of the parts of the intermittently feeding is somewhat offset. Thus, not so high accuracy is required for the motor and so as to make it possible to employ an inexpensive motor.

Since the intermittently feeding member according to the present invention is arranged as described above, if the intermittently feeding member is employed, for example, in an intermittently feeding mechanism, the accuracy of the stop position of the movable member can be improved and it is not necessary to use a high accurate and expensive motor, thereby reducing in cost.

There are further advantages that the movable member of the intermittently feeding mechanism can be smoothly displaced, etc.

I claim:

1. In an intermittent drive mechanism of the type comprising a shaft rotatable about an axis, a spiral groove formed in the outer peripheral surface of the shaft leading in one axial direction, and a tip end portion of a movable member riding in the spiral groove, the sprial groove having a plurality of groove portions positioned offset in stepwise axial increments along the sprial groove, each groove portion having a bottom wall formed at a predetermined depth and inclined side walls opposing each other on each side of the bottom wall such that the tip end portion of the movable member can ride along the bottom wall of the groove guided by the inclined side walls, the tip end portion being intermittently driven in stepwise axial increments along the one axial direction as it rides along successive groove portions of the spiral groove in conjunction with rotation of the shaft, the improvement comprising:

each groove portion having a linear bottom wall extending in a direction transverse to said axis of said shaft, a leading side wall on the side leading in said axial direction, and a trailing side wall on the opposite side trailing in said axial direction;

each groove portion alternating with a chamfered portion leading from a preceeding groove portion to a next groove portion, each chamfered portion having opposing leading and trailing side walls for guiding the transition of said tip portion from the preceeding groove portion to the next groove portion, each side wall of said chamfered portion extending from an end of a side wall of the preceeding groove portion to a beginning of a side wall of the next groove portion;

the leading side wall of each chamfered portion being positioned to overlap along said axis with the end of a trailing side wall of the preceeding groove portion;

the beginning of the leading side wall of the next groove portion also being positioned to overlap along said axis with the end of the trailing side wall of the preceeding groove portion; and the trailing side wall of each chamfered portion being positioned to overlap along said axis with the beginning of a leading side wall of the next groove portion.

2. The intermittent drive mechanism of claim 1, wherein said groove portions have linear bottom portions of a long length, and said chamfered portions have a relatively short length.

3. A method of operating an intermittent drive mechanism according to claim 1, in which said shaft is rotated by a motor to move said movable member in a predetermined direction when said tip end portion is in each of said chamfered portions, while said motor is deenergized to stop the movement of said shaft when said tip end portion is in each of said groove portions.

4. A method of operating a mechanism according to claim 3, in which said movable member is slidably supported by a guide bar and said tip end portion is connected to said movable member through a plate spring.

* * * * *

UNITED STATES PATENT AND TRADEMARK OFFICE
CERTIFICATE OF CORRECTION

PATENT NO. : 4,638,677  Page 1 of 2

DATED : January 27, 1987

INVENTOR(S) : Takamichi Fuke

It is certified that error appears in the above-identified patent and that said Letters Patent is hereby corrected as shown below:

The Title Page should be deleted to appear as per attached Title Page.

Signed and Sealed this

Twelfth Day of July, 1988

Attest:

DONALD J. QUIGG

*Attesting Officer*     *Commissioner of Patents and Trademarks*

United States Patent [19]
Fuke

[11] Patent Number: 4,638,677
[45] Date of Patent: Jan. 27, 1987

[54] INTERMITTENT DRIVE MEMBER

[75] Inventor: Takamichi Fuke, Furukawa, Japan

[73] Assignee: Alps Electric Co., Ltd., Japan

[21] Appl. No.: 650,401

[22] Filed: Sep. 12, 1984

[30] Foreign Application Priority Data

Sep. 12, 1983 [JP] Japan ............... 58-140169[U]

[51] Int. Cl.⁴ .................. F16H 25/20; F16H 55/02
[52] U.S. Cl. .................... 74/84 R; 74/89.15; 74/424.8 R; 74/426; 74/458
[58] Field of Search .......... 74/84 R, 89.15, 424.8 R, 74/426, 458, 459; 360/106

[56] References Cited

U.S. PATENT DOCUMENTS

| | | | |
|---|---|---|---|
| 1,384,541 | 7/1921 | Schmick | 74/458 |
| 1,384,543 | 7/1921 | Schmick | 74/458 |
| 1,482,622 | 2/1924 | Schmick | 74/458 |
| 1,989,611 | 1/1935 | Dall et al. | 74/459 |
| 3,475,705 | 10/1969 | Lindemann | 74/89.15 |
| 3,640,138 | 2/1972 | Hahn et al. | 74/89.15 |
| 4,383,283 | 5/1983 | Machut | 360/97 |

Primary Examiner—Lawrence Staab
Attorney, Agent, or Firm—Guy W. Shoup

[57] ABSTRACT

An intermittent drive member comprises a shaft with a spiral groove formed in the outer periphery of the shaft. The spiral groove includes a plurality of groove portions each having a linear bottom portion with a lead angle of zero degrees and a plurality of chamfered portions. The groove portions are successively formed by being axially shifted one after one along the shaft, and each of the chamfered portions forms the connection between adjacent groove portions.

The intermittent drive member is employed in a mechanism which includes an electric motor for driving the shaft and a movable member having a tip end portion slidably fitted in the spiral groove so that the movable member is displaced when the shaft is rotated. The shaft is rotated to move the movable member in a predetermined direction when the tip end portion is in each of the chamfered portions, while the motor is deenergized to stop the movement of the shaft when the tip end portion is in each of the groove portions.

4 Claims, 12 Drawing Figures